US012724978B2

(12) United States Patent
Lipskin

(10) Patent No.: US 12,724,978 B2
(45) Date of Patent: Sep. 1, 2026

(54) COMPUTER-IMPLEMENTED METHOD AND SYSTEM FOR CONVERTING A HUMAN INTENT OF A USER INTO AN ARTIFICIAL INTELLIGENCE PROMPT

(71) Applicant: The Mirror Project LLC, Boca Raton, FL (US)

(72) Inventor: Scott Lipskin, Boca Raton, FL (US)

(73) Assignee: The Mirror Project LLC, Boca Raton, FL (US)

( * ) Notice: Subject to any disclaimer, the term of this patent is extended or adjusted under 35 U.S.C. 154(b) by 0 days.

(21) Appl. No.: 19/540,802

(22) Filed: Feb. 16, 2026

(65) Prior Publication Data

US 2026/0178836 A1 Jun. 25, 2026

Related U.S. Application Data

(63) Continuation of application No. 19/425,024, filed on Dec. 18, 2025.

(51) Int. Cl.
*G06F 40/30* (2020.01)
*G06F 16/33* (2025.01)
(Continued)

(52) U.S. Cl.
CPC .............. *G06F 40/30* (2020.01); *G06F 40/40* (2020.01)

(58) Field of Classification Search
CPC .. G06F 16/3329; G06F 40/30; G06F 16/2455; G06F 16/3322; G06F 16/332; G06F 16/33
(Continued)

(56) References Cited

U.S. PATENT DOCUMENTS 8,321,200 B2 11/2012 Rachamim
9,805,718 B2 10/2017 Ayan et al.
(Continued)

FOREIGN PATENT DOCUMENTS

WO 2025012970 1/2025
WO WO-2025012970 A1 * 1/2025 ......... G06F 16/9535

OTHER PUBLICATIONS

Tang et al. Clarifying Ambiguities: on the Role of Ambiguity Types in Prompting Methods for Clarification Generation. In Proceedings of the 48th International ACM SIGIR Conference on Research and Development in Information Retrieval (SIGIR '25). Association for Computing Machinery, New York, NY, USA (Year: 2025).*
(Continued)

*Primary Examiner* — Richemond Dorvil
*Assistant Examiner* — Rodrigo A Chavez
(74) *Attorney, Agent, or Firm* — The Powers IP Law Firm

(57) ABSTRACT

A computer-implemented method is provided for converting a human intent of a user into an artificial intelligence (AI) prompt. The method includes receiving a textual statement from the user, the textual statement comprising the human intent; employing an interpretation generation engine to generate a plurality of semantic interpretations of the textual statement; receiving a selection of a first semantic interpretation of the plurality of semantic interpretations from the user, the first semantic interpretation comprising a clarified human intent; generating the AI prompt based at least in part on the selection such that the AI prompt is configured to elicit a response from an AI model based on the clarified human intent; and sending the AI prompt to the AI model in order to generate the response.

14 Claims, 7 Drawing Sheets

(51) Int. Cl.
*G06F 16/332* (2025.01)
*G06F 40/40* (2020.01)

(58) Field of Classification Search
USPC ........................................................ 704/9, 257
See application file for complete search history.

(56) References Cited

U.S. PATENT DOCUMENTS

| | | | | |
|---|---|---|---|---|
| 10,303,769 | B2 | 5/2019 | Zorzin | |
| 10,559,308 | B2 | 2/2020 | Smythe et al. | |
| 10,755,046 | B1 | 8/2020 | Lewis Meza et al. | |
| 11,176,210 | B1 | 11/2021 | Miller et al. | |
| 11,601,453 | B2 | 3/2023 | Janakiraman | |
| 11,710,002 | B1 | 7/2023 | Betteridge et al. | |
| 12,001,462 | B1 | 6/2024 | Madisetti et al. | |
| 12,001,862 | B1 * | 6/2024 | Liu | G06Q 10/00 |
| 12,032,922 | B2 * | 7/2024 | Li | G06F 3/0481 |
| 12,254,271 | B1 | 3/2025 | Norris | |
| 12,254,878 | B1 | 3/2025 | Rottmann | |
| 12,367,790 | B2 | 7/2025 | Nyirenda | |
| 12,475,325 | B2 | 11/2025 | Tangari et al. | |
| 2018/0052842 | A1 | 2/2018 | Hewavitharana et al. | |
| 2021/0081615 | A1 * | 3/2021 | McRitchie | G06F 40/30 |
| 2022/0383872 | A1 * | 12/2022 | Li | G06F 40/205 |
| 2023/0305822 | A1 * | 9/2023 | Ferrucci | G06F 8/41 |
| 2023/0315722 | A1 * | 10/2023 | Saxe | G06F 16/3322 726/1 |
| 2023/0409836 | A1 * | 12/2023 | Balasubrahmanian | G06F 40/279 |
| 2024/0311619 | A1 | 9/2024 | Licato | |
| 2024/0370479 | A1 | 11/2024 | Hudetz et al. | |
| 2025/0053735 | A1 * | 2/2025 | Shevchenko | G06F 40/30 |
| 2025/0117605 | A1 * | 4/2025 | De Wynter | G06F 40/30 |
| 2025/0181613 | A1 | 6/2025 | Aliaga et al. | |
| 2025/0278433 | A1 * | 9/2025 | Gupta | G06F 16/90328 |
| 2025/0328914 | A1 | 10/2025 | Opedal | |
| 2025/0335717 | A1 * | 10/2025 | Zhang | G06F 40/40 |
| 2025/0370773 | A1 | 12/2025 | Stan et al. | |
| 2026/0004371 | A1 * | 1/2026 | O'Malley | G06Q 50/184 |

OTHER PUBLICATIONS

Toufique Ahmed et al. Automatic Semantic Augmentation of Language Model Prompts (for Code Summarization). In Proceedings of the IEEE/ACM 46th International Conference on Software Engineering (ICSE '24). Association for Computing Machinery, New York, NY, USA (Year: 2024).*

Mu, Fangwen et al. ClarifyGPT: Empowering LLM-based Code Generation with Intention Clarification. ArXiv abs/2310.10996 (2023) : n. pag. (Year: 2023).*

Mingyue Yuan et al., Towards Human-AI Synergy in UI Design: Leveraging LLMs for UI Generation with Intent Clarification and Alignment, Dec. 31, 2025.

Lingqi Guo , Lei Zhang , Jingyu Wang , Senior Member, IEEE, Jianyu Wu , Yuhang Yan , Haifeng Sun, Senior Member, IEEE, Bo He , Member, IEEE, QI QI , Senior Member, IEEE, and Jianxin Liao, Intent-Based Autonomous Network Framework Guided by Large Language Model, Dec. 31, 2025.

Chirag Shah et al., Using Large Language Models to Generate, Validate, and Apply User Intent Taxonomies, Dec. 31, 2025.

Jie Zou, Mohammad Aliannejadi, and Evangelos Kanoulas, Users Meet Clarifying Questions: Toward a Better Understanding of User Interactions for Search Clarification, Dec. 31, 2023.

Muhammad Haseeb, Context Engineering for Multi-Agent LLM Code Assistants Using Elicit, NotebookLM, ChatGPT, and Claude Code, Dec. 31, 2025.

Hamed Zamani, Bhaskar Mitra, Everest Chen, Gord Lueck, Fernando Diaz, Paul N. Bennett, Nick Craswell, and Susan T. Dumais, Analyzing and Learning from User Interactions for Search Clarification, Dec. 31, 2020.

Jai Smith, "Introducing Plan Mode," Cursor, 2025, pp. 1-4, https://cursor.com/blog/plan-mode.

Changelog, "Browser Controls, Plan Mode, and Hooks" Cursor, 2025, pp. 1-9, https://cursor.com/changelog/1-7.

Claude Code Docs, "Handle Approvals and User Input," 2026, pp. 1-19, https://code.claude.com/docs/en/agent-sdk/user-input.

* cited by examiner

COMPUTER-IMPLEMENTED METHOD AND SYSTEM FOR CONVERTING A HUMAN INTENT OF A USER INTO AN ARTIFICIAL INTELLIGENCE PROMPT

CROSS-REFERENCE TO RELATED APPLICATION

This application is a continuation patent application which claims priority to and claims the benefit of U.S. patent application Ser. No. 19/425,024, filed Dec. 18, 2025, the contents of which are incorporated herein by reference in their entirety.

BACKGROUND OF THE INVENTION

Artificial Intelligence (AI) is becoming more and more integrated into society as time goes on. However, interacting with AI presents challenges for people, particularly elderly people who do not know how to "talk" to AI systems in the way that produces consistently accurate, useful responses. Common issues include that they phrase prompts vaguely or emotionally (e.g., "This thing is broken, what do I do?"). Poor prompts lead to bad answers or hallucinations, which often leads users to blame the AI. This is a universal friction point across consumer and enterprise AI tools.

It is with respect to these and other considerations that the instant disclosure is concerned.

SUMMARY

In one example, a computer-implemented method for converting a human intent of a user into an artificial intelligence (AI) prompt is provided. The method comprises receiving a textual statement from the user, the textual statement comprising the human intent; employing an interpretation generation engine to generate a plurality of semantic interpretations of the textual statement; receiving a selection of a first semantic interpretation of the plurality of semantic interpretations from the user, the first semantic interpretation comprising a clarified human intent; generating the AI prompt based at least in part on the selection such that the AI prompt is configured to elicit a response from an AI model based on the clarified human intent; and sending the AI prompt to the AI model in order to generate the response.

In another example, a system for converting a human intent of a user into an artificial intelligence (AI) prompt is provided. The system comprises a user input device configured to receive a textual statement from the user, the textual statement comprising the human intent; an interpretation generation engine configured to receive the textual statement and generate a plurality of semantic interpretations of the textual statement; a user selection module configured to receive a selection of a first semantic interpretation of the plurality of semantic interpretations from the user, the first semantic interpretation comprising a clarified human intent; a prompt formulation engine configured to generate the AI prompt based at least in part on the selection such that the AI prompt is configured to elicit a response from an AI model based on the clarified human intent; an AI engine interface configured to send the AI prompt to the AI model; and a response handling module configured to generate the response.

It is to be understood that both the foregoing general description and the following detailed description are exemplary and explanatory and are intended to provide further explanation of the invention as claimed.

DETAILED DESCRIPTION OF THE INVENTION

In the following description, for the purposes of explanation, numerous specific details are set forth in order to provide a thorough understanding of various embodiments of the invention. As used herein, "embodiments" are non-limiting examples of apparatuses or methods employing one or more of the inventive concepts disclosed herein. It is apparent, however, that various embodiments may be practiced without these specific details or with one or more equivalent arrangements. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features of the various embodiments may be otherwise combined, separated, interchanged, and/or rearranged without departing from the inventive concepts.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "may include," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, may be used as terms of approximation and not as terms of degree, and, as such, are utilized to account for inherent deviations in measured, calculated, and/or provided values that would be recognized by one of ordinary skill in the art.

As employed herein, the term "number" shall mean one or an integer greater than one (i.e., a plurality).

Figure 1:
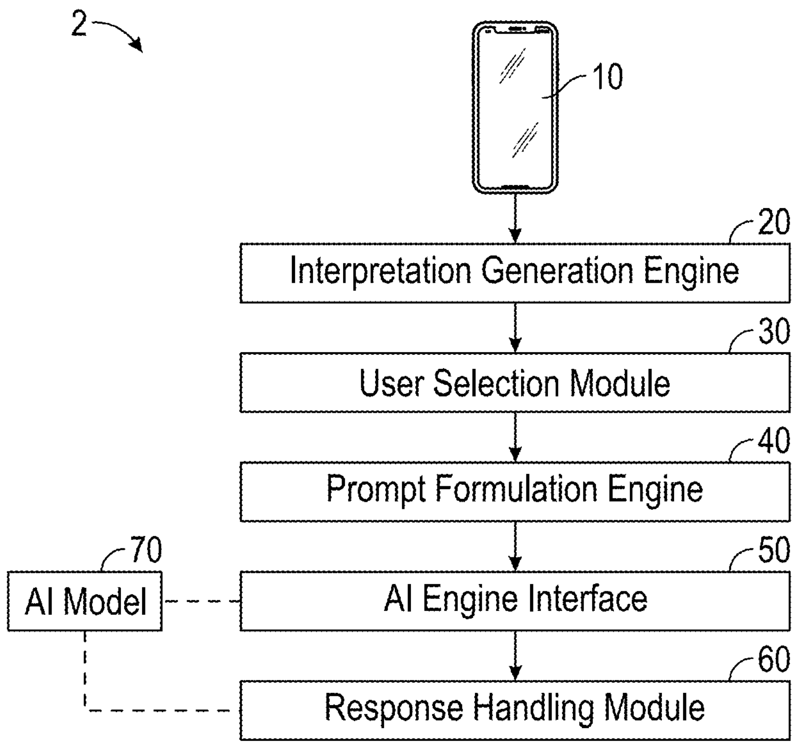
FIG. 1 shows a simplified view of a system for converting a human intent of a user into an artificial intelligence (AI) prompt, in accordance with one non-limiting embodiment of the disclosed concept.

FIG. 1 shows a system 2 for converting a human intent of a user into an artificial intelligence (AI) prompt, in accordance with one non-limiting embodiment of the disclosed concept. In one example, the system 2 translates natural-language user intent into optimized AI prompts via a guided, multi-option intent clarification interface. In plain terms, the user types what they want to know in their own words, and the system 2 then generates a plurality of refined semantic interpretations of that request. In one example, each interpretation may be framed as a specific, structured query style directive (e.g., without limitations, step-by-step instructions, explanation, fastest workaround, preparation checklist, etc.). The user may then simply select the option that best matches what they actually want, and based at least in part on that selection, the system 2 may generate a high-precision AI prompt that uses the correct trigger words, structure, and/or context to elicit the best possible response from the underlying AI model. Subsequently, that optimized prompt may then be sent to the AI model. Additionally, during operation of the system 2, the user may only see a clean interface of a user input device, and not internal machine-friendly formulations that are generated for the semantic interpretations.

The system 2 thus functions as an intent-translation layer between the human user and the AI model in order to make interaction with AI much simpler for elderly people and others who are not as able to generate machine-friendly AI prompts. As a result, the system 2 makes resulting AI responses more accurate because AI prompts in the system 2 are based not on human intent, but instead are based on clarified human intent. Right now, most AI interfaces (not shown) assume users will either learn prompting or will accept mediocre answers. There is no standardized, system-level translation layer that converts messy human intent into well-formed prompts. The system 2 solves these issues in the art.

In one example, the system 2 includes a user input device 10, an interpretation generation engine 20, a user selection module 30, a prompt formulation engine 40, an AI engine interface 50, and a response handling module 60. In the example of FIG. 1, the system 2 may be configured to interact with an AI model 70, which may be any AI model. More specifically, the system 2 may be model-agnostic, such that it can sit on top of any model or provider (e.g., OpenAI, Google, etc.), and act as a universal human-to-AI translation layer.

The user input device 10 is depicted as being a mobile device 10, but it will be appreciated that any other user device may be employed by the system 2 in place of the mobile device, including, for example and without limitation, tablets, computers, mobile watches, and the like. The interpretation generation engine 20 may include at least one of a number of rules, a number of templates, a number of probabilistic models, and at least one machine-learning model. In one example, the interpretation generation engine 20 may operate by mapping user input against stored semantic patterns, intent templates, prior user selections, confidence thresholds, and/or probabilistic scoring models to generate distinct candidate interpretations.

Figure 2A:
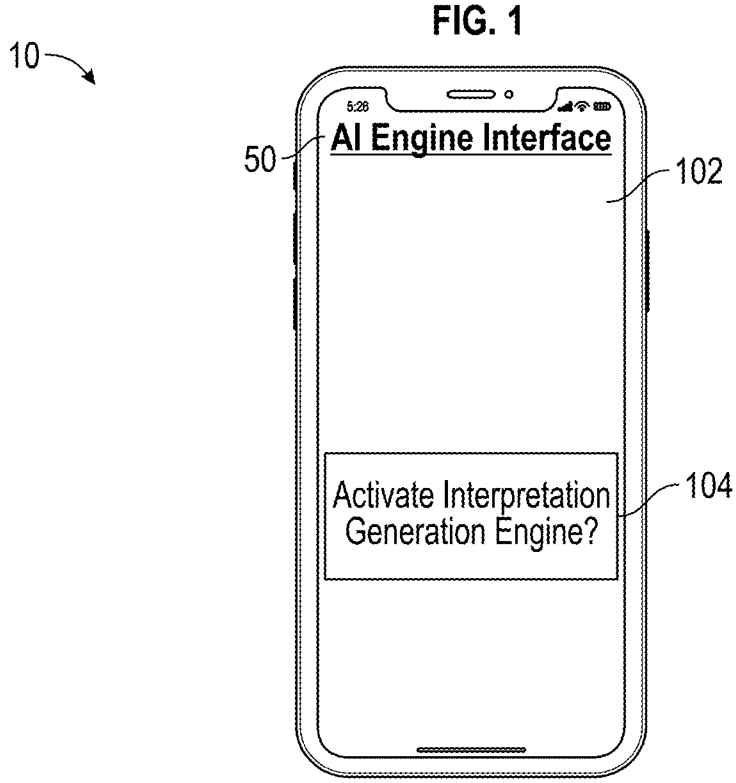
FIG. 2A shows a user input device displaying an AI engine interface, and being configured for selective activation of an interpretation generation engine of the system of FIG. 1.

FIG. 2A shows the user input device 10 having a display screen 102 displaying the AI engine interface 50 to a user. In accordance with the disclosed concept, it will be appreciated that the system 2 may be either automatically configured to operate via the user input device 10, or may be selectively activatable such that a user selection governs downstream behavior of the system 2. In the example of FIG. 2A, responsive to the user selecting a button 104, the interpretation generation engine 20 may be selectively activated, and the AI engine interface 50 may be configured to receive a textual statement from the user.

Accordingly, the system 2 may be invoked as an optional "Prompt Mode." In practice, this means the user can toggle Prompt Mode (e.g., the button 104) on or off as needed. When activated, the system 2 translates natural-language intent into optimized AI instructions and/or trigger structures. When deactivated, the user interacts with the system 2 normally (e.g., typed or spoken input without translation). The disclosed optional-mode architecture may be intentional. Specifically, users may not always want or need mediation, such that a "Prompt Mode" may be invoked only when clarity, precision, and/or outcome-optimization may be desired. The system 2 thus supports selective activation, user-controlled invocation, compatibility with both typed and spoken input, and integration as a built-in or layered operator mode rather than a mandatory interface.

Figure 2B:
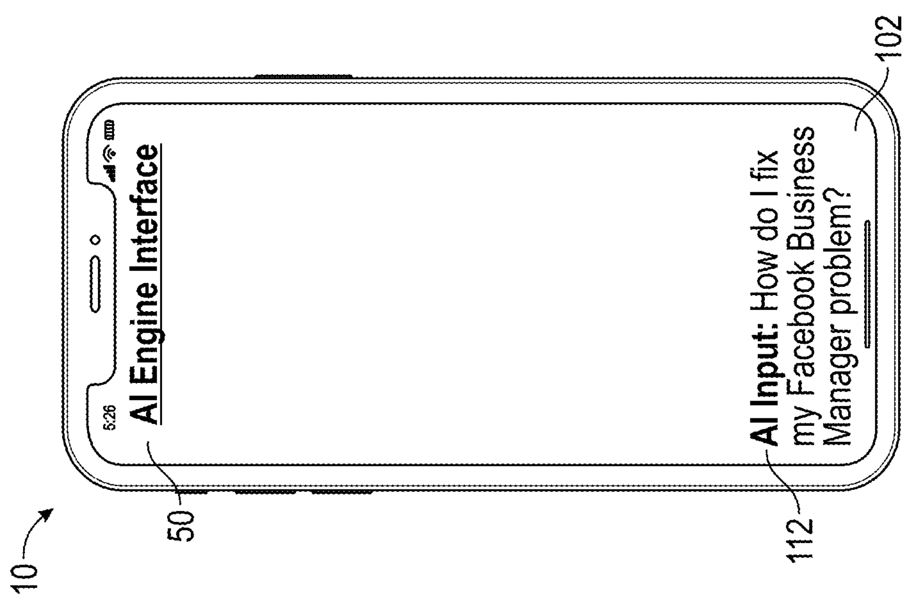
FIG. 2B shows the user input device of FIG. 2A displaying a textual statement of the user.

FIG. 2B illustrates the display screen 102 after the user has selected the button 104, or without a selection of the button 104 in the instance when the interpretation generation engine 20 is automatically activated. As shown, the user input device 10 may be configured to receive a textual statement 112 from a user that has human intent. In one example, the textual statement 112 may be a typed textual statement and may be a spoken textual statement. It will be appreciated that the textual statement 112 may not be configured to elicit an accurate response from the AI model 70. That is, the textual statement 112 on its own may be more likely than not to elicit a hallucinatory response from the AI model 70. The system 2 thus provides a remedy.

Figure 2C:
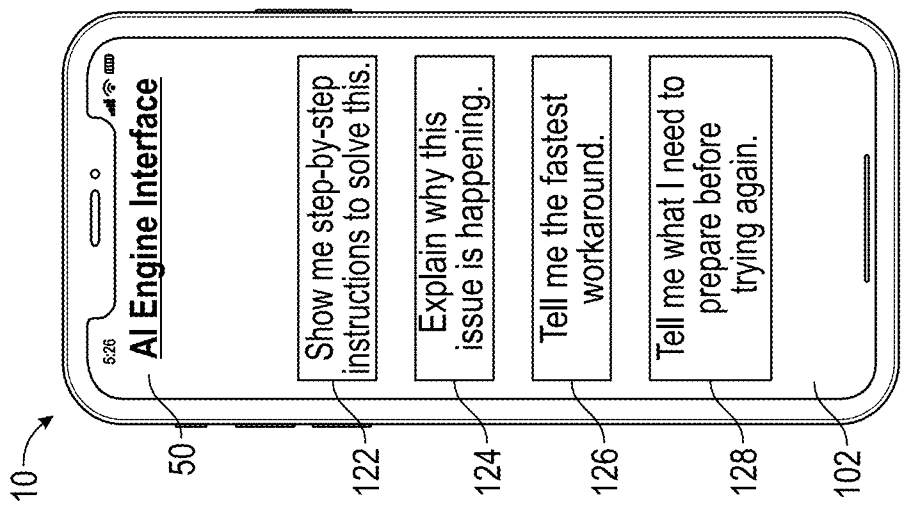
FIG. 2C shows the user input device of FIG. 2B displaying a plurality of semantic interpretations of the textual statement.

More specifically and with reference to FIG. 2C, responsive to the system 2 receiving the textual statement 112, the interpretation generation engine 20 may be configured to receive the textual statement 112 and generate a plurality of semantic interpretations 122,124,126,128 of the textual statement 112. In one example, each of the semantic interpretations 122,124,126,128 may be framed as a structured query style directive.

As shown in FIG. 2C, each of the semantic interpretations 122,124,126,128 may have different clarified human intent of the textual statement 112, thereby resolving ambiguity in meaning, scope, constraints or objective. As will be discussed, any one of the semantic interpretations 122,124,126,128 may allow the user to actively generate a more accurate AI response than if the textual statement 112 were directly introduced into the AI model 70. Such a resulting AI response may be more aligned with what the user actually wanted when the textual statement 112 was first typed or spoken. It will also be appreciated that the user selection module 30 may be configured to receive a selection from the user of any one of the semantic interpretations 122,124,126, 128. In the example of FIGS. 2A-2E, the first semantic interpretation 122 has been selected by the user.

Figure 2E:
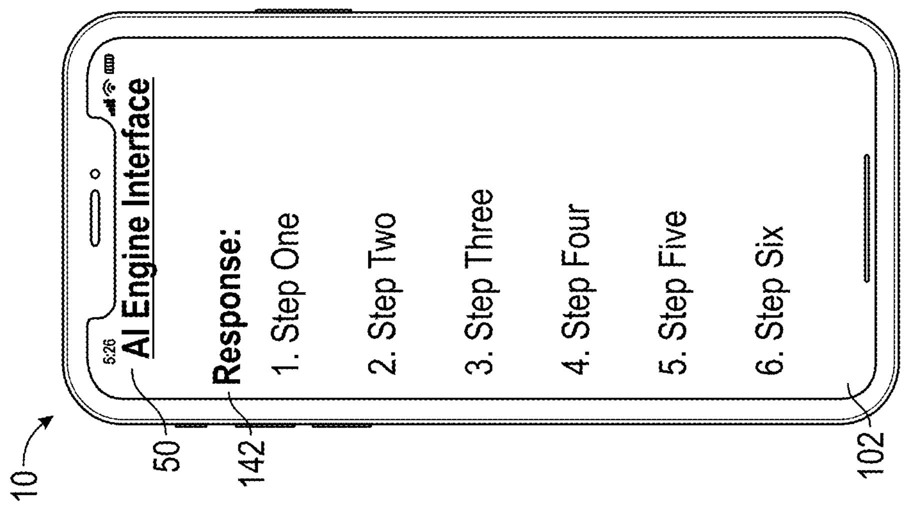
FIG. 2E shows the user input device of FIG. 2D displaying a response by an AI model.
Figure 2D:
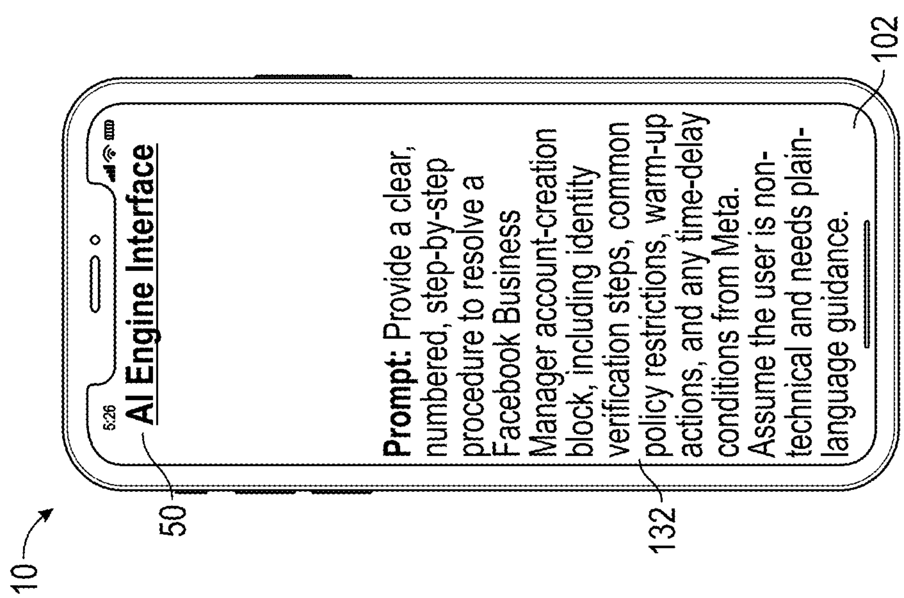
FIG. 2D shows the user input device of FIG. 2C displaying an AI prompt that has been generated.

FIG. 2D shows the user input device 10 displaying an AI prompt 132 that has been generated by the system 2 responsive to the selection of the user of the first semantic interpretation 122. In one example, the prompt formulation engine 40 may be configured to generate the AI prompt 132 based at least in part on the selection such that the AI prompt 132 is configured to elicit a response from the AI model 70 based on the clarified human intent of the first semantic interpretation 122. It will be appreciated that the AI prompt 132 may include trigger words specifically designed to improve AI accuracy and reduce hallucinations. Moreover, generation of the AI prompt 132 may be further based on the textual statement 112 in addition to the selection of the first semantic interpretation 122.

Accordingly, by basing the AI prompt 132 at least in part on the first semantic interpretation 122, the AI prompt 132 is much better configured to elicit a response from the AI model 70 that does not contain significant amounts of hallucinatory content. In other words, the system 2 therefore generates more accurate responses. For an elderly person who may be uncomfortable with prompting, this translates into a much better AI experience in which new skills do not have to be learned.

FIG. 2E shows the user input device 10 displaying a response 142 that was generated by the AI model 70 responsive to receiving the AI prompt 132. In one example, the AI engine interface 50 may be configured to send the AI prompt 132 to the AI model 70, and the response handling module 60 may be configured to generate the response 142. The system 2 thus provides a bridge for elderly people and others who cannot easily write or say AI prompts which elicit non-hallucinatory AI responses. In other words, the system 2 makes the AI model 70 significantly easier to communicate with.

Figure 3B:
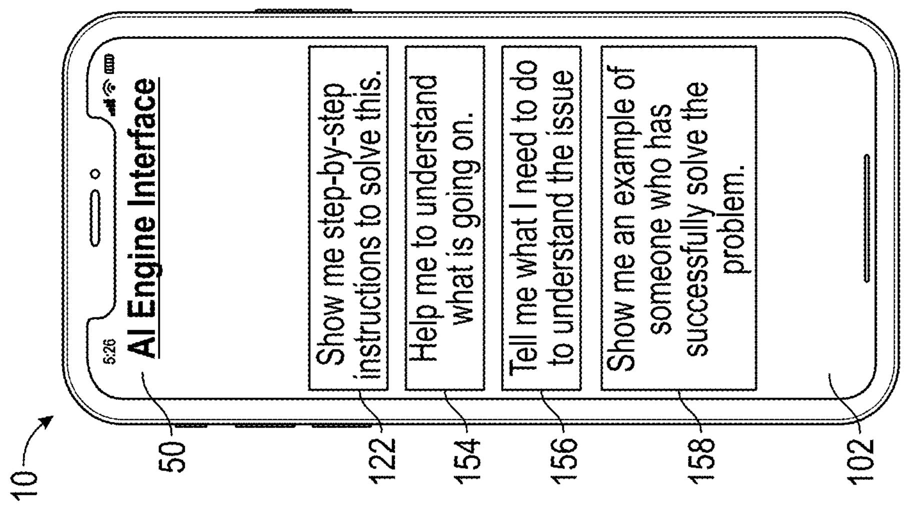
FIG. 3B shows the user input device of FIG. 3A displaying a plurality of semantic interpretations of the textual statement of FIG. 3A, and which include at least one of the semantic interpretations of FIG. 2C.
Figure 3A:
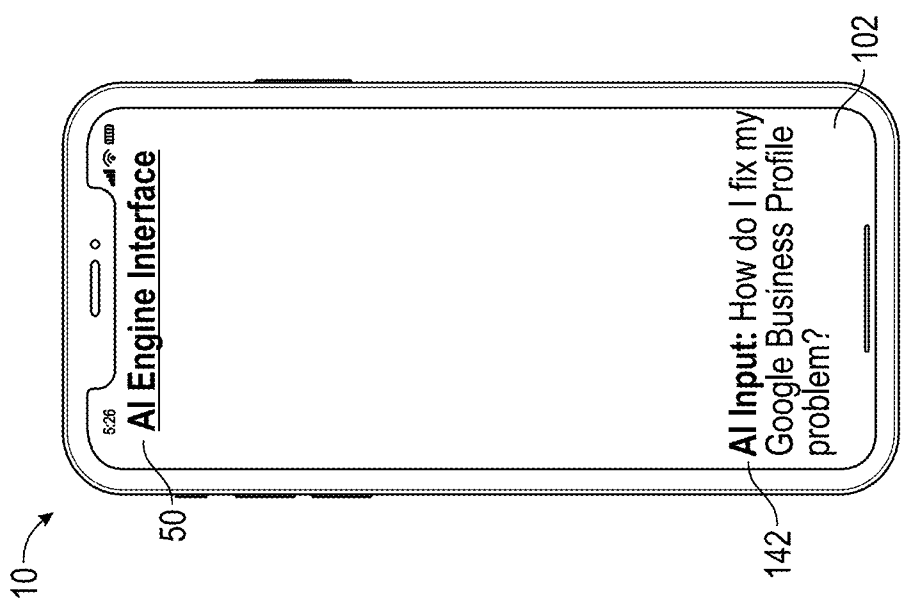
FIG. 3A shows the user input device of FIG. 2A being configured to receive another textual statement from the user.

It will also be appreciated that the system 2 may be configured to save and utilize selections of the semantic interpretations 122,124,126,128. For instance, in the case of FIGS. 2A-2E, the selection of the first semantic interpretation 122 may be stored by the system 2 in a storage (e.g., memory, cloud storage, and the like). Subsequently, when the user interacts with AI engine interface 50 a second time, third time, etc., this initial selection is remembered and utilized. FIGS. 3A and 3B illustrate this example.

In the example of FIG. 3A, the user input device 10 is shown displaying another textual statement 142 on the display screen 102. In one example, the textual statement 142 has a request signature that matches a request signature of the textual statement 112. Thus, as shown in FIG. 3B, when the textual statement 142 is sent by the user, the interpretation generation engine 20 may generate a second plurality of semantic interpretations 122,154,156,158 of the statement 142 such that the first semantic interpretation 122 is the same as the first semantic interpretation 122 of the first plurality of semantic interpretations 122,124,126,128 depicted in FIG. 2C. In this manner, the first semantic interpretation 122 may therefore be configured to compound over time such that the user may have an even better interaction experience with the AI model 70. Additionally, it will also be appreciated that the saving of the first semantic interpretation 122 may be performed independent of a conversation between the user and the AI model 70, such as a conversation including data beyond the first and second textual statements 112,142.

Figure 4:
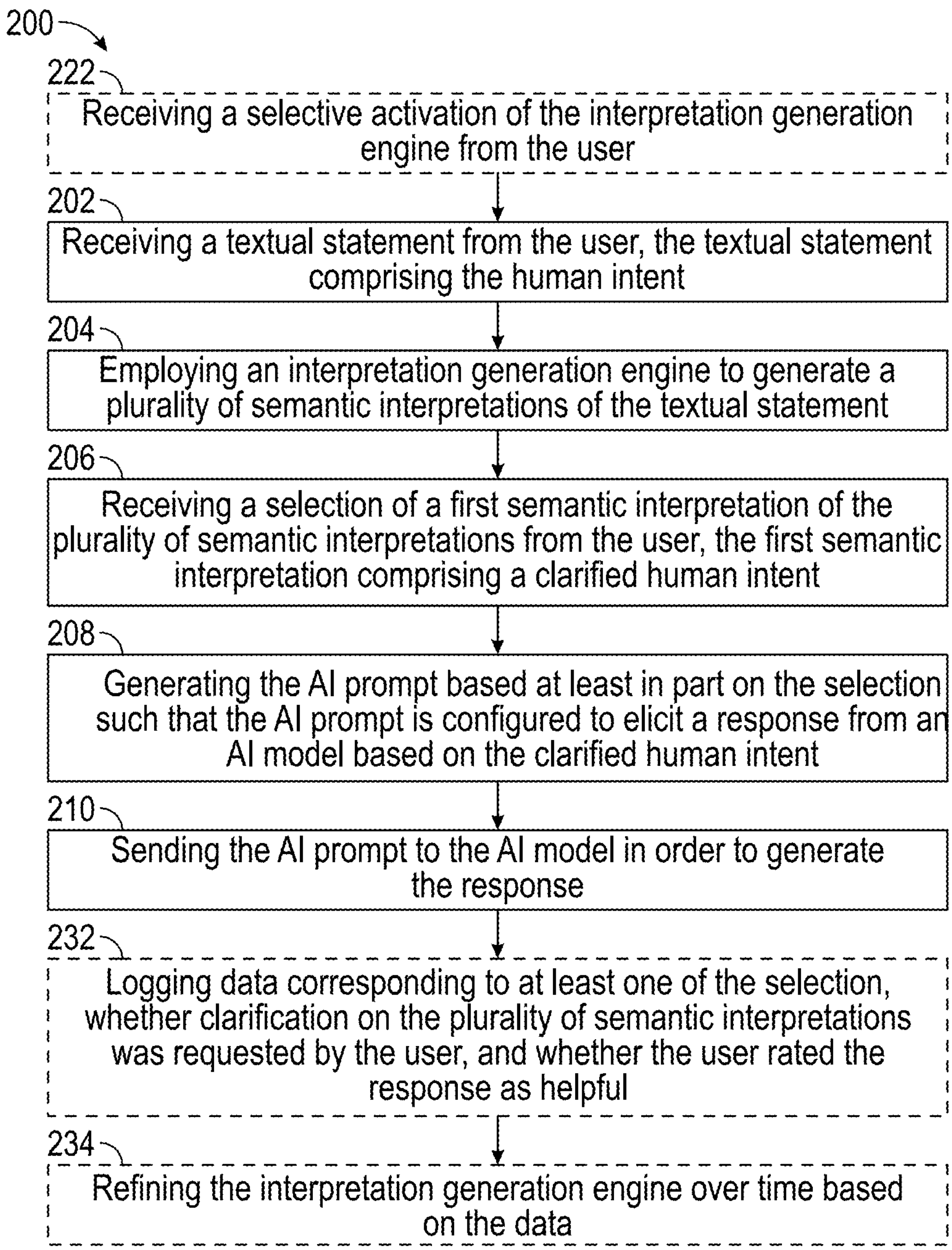
FIG. 4 shows an example method for converting a human intent of a user into an AI prompt, and shows optional method steps in dashed line drawing.

FIG. 4 shows an example computer-implemented method 200 for converting a human intent of a user into the AI prompt 132. The method 200 may be performed by the system 2, and in one example may include a first step 202 of receiving a textual statement 112,142 from the user, the textual statement 112,142 comprising the human intent; a second step 204 of employing an interpretation generation engine 20 to generate a plurality of semantic interpretations 122,124,126,128,154,156,158 of the textual statement; a third step 206 of receiving a selection of a first semantic interpretation 122 of the plurality of semantic interpretations 122,124,126,128,154,156,158 from the user, the first semantic interpretation 122 comprising a clarified human intent; a fourth step 208 of generating the AI prompt 132 based at least in part on the selection such that the AI prompt 132 is configured to elicit a response 142 from an AI model 70 based on the clarified human intent; and a fifth step 210 of sending the AI prompt 132 to the AI model in order to generate the response 142. The method 200 may also optionally include a step 222 of receiving a selective activation of the interpretation generation engine 20 from the user. Additionally, the method 200 may be performed without exposing to the user machine-optimized prompt representations (e.g., structured tokens, constraints, system instructions, embeddings, or control directives) that are generated by the system 2 for each of the semantic interpretations 122,124,126,128,154,156,158. In other words, the machine-optimized prompt representations of the semantic interpretations 122,124,126,128,154,156,158 may not be configured to be visible to the user via the user input device 10.

Continuing to refer to FIG. 4, the method 200 may optionally include a step 232 of logging data corresponding to at least one of the selection, whether clarification on the plurality of semantic interpretations 122,124,126,128,154,156,158 was requested by the user, and whether the user rated the response 142 as helpful; and a step 234 of refining the interpretation generation engine 20 over time based on the data. In one example, the step 232 may include logging data corresponding to each of the selection, whether clarification on the plurality of semantic interpretations 122,124,126,128,154,156,158 was requested by the user, and whether the user rated the response 142 as helpful. In this manner, the semantic interpretations 122,124,126,128,154,156,158 generated by the interpretation generation engine 20 may become more and more tailored to the human intent of the user as time goes on, thereby allowing the user to have desirable communication with the AI model 70 substantially devoid of hallucinations.

In one example, before the second step 204, the method 200 may further include steps that may be performed by the interpretation generation engine 20, including determining whether the textual statement 112,142 has a semantic clarity level above a predetermined threshold, and either sending the textual statement directly to the AI model 70 without first employing the interpretation generation engine 20 if the semantic clarity level is above the predetermined threshold, or employing the interpretation generation engine 20 to generate the plurality of semantic interpretations 122,124,126,128,154,156,158 if the semantic clarity level is below the predetermined threshold.

In other words, the system 2 and method 200 contemplate that if the user inputs a request that is already semantically clear, that request may be sent directly to the AI model 70. That is, the intent-clarification step of the disclosed method 200 may be conditionally invoked such that if a user's initial request is semantically clear, it may pass straight through with no interruption. Clarification options may only, in one example, be surfaced when reasonable semantic interpretations materially diverge (e.g., when the clarity level is below the predetermined threshold). In addition, users may optionally request clarification or toggle clarification behavior so that the system 2 does not slow users down unnecessarily.

The method 200 may further include saving the first semantic interpretation 122 after the selection from the user, receiving the second textual statement 142 from the user, and employing the interpretation generation engine 20 to generate the second plurality of semantic interpretations 122,154,156,158 of the second textual statement 142. In this instance, the second plurality of semantic interpretations 122,154,156,158 may include the first semantic interpretation 122 because the second textual statement 142 has a request signature matching a request signature of the first textual statement 112, and in order to allow the first semantic interpretation 122 to compound over time. These steps may include displaying the second plurality of semantic interpretations 122,154,156,158 to the user in a manner wherein the first semantic interpretation 122 is displayed as a first option. Thus, the user will be more likely to select the first semantic interpretation 122, thereby saving even more time while interacting with the AI model 70, and resulting in at least streamlined communication and reduced hallucinations.

Additionally, the system 2 may also include an optional "Final Prompt Recall" layer that saves the AI prompt 132 generated after the system 2 resolves ambiguity, and then later (e.g., without limitation, even months later, across new chat threads that have been newly initiated) can surface the AI prompt 132 as the first suggested option when a similar user request appears again. In one example, this may not require full conversation memory, but instead the system 2 may store only prompt-local memory surrounding the finalized AI prompt 132, for example with minimal metadata/signature needed to recognize similarity later. Accordingly, the goal may be to reduce repeated clarification cost and let proven prompts compound over time.

Figure 5:
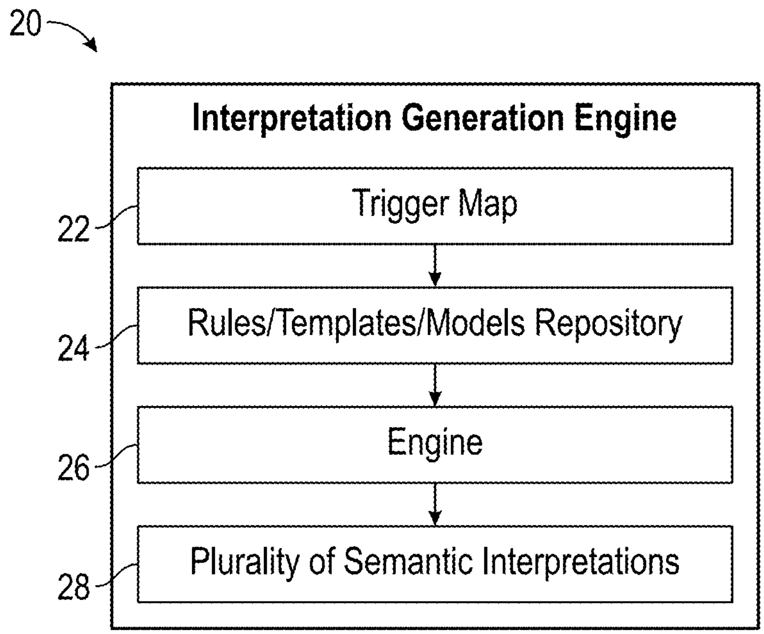
FIG. 5 shows a simplified view of an internal architecture for an interpretation generation engine of the system of FIG. 1.

FIG. 5 illustrates a broad, non-limiting internal architecture of the interpretation generation engine 20. As shown, the interpretation generation engine 20 comprises a trigger map 22, a rules/templates/models repository 24, and an engine 26. The engine 26 may be configured to generate the plurality of semantic interpretations 122,124,126,128,154,156,158 responsive to a user request.

Figure 6:
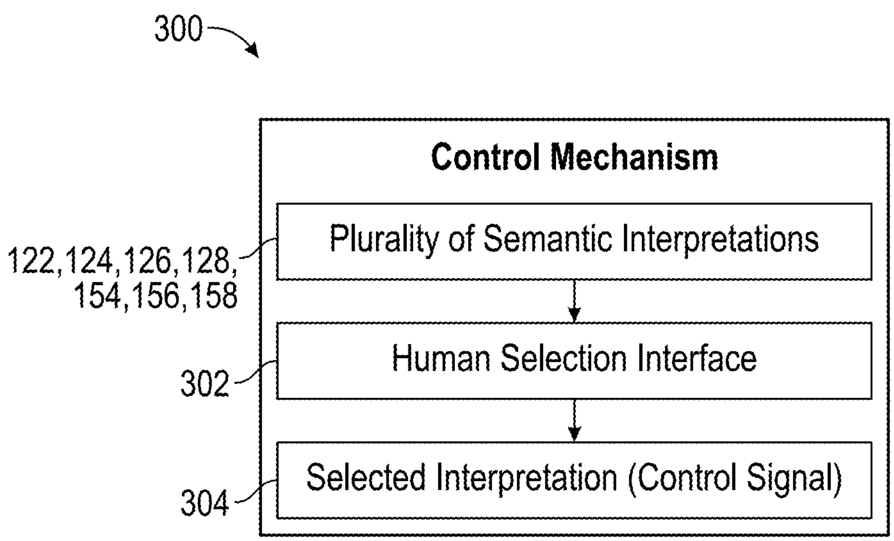
FIG. 6 show a simplified view of a control mechanism for the system of FIG. 1.

FIG. 6 illustrates a control mechanism 300 for the system 2 of FIG. 1. In one example, the control mechanism 300 corresponds to human confirmation. As shown, one of the semantic interpretations 122,124,126,128,154,156,158 may be sent to a human selection interface 302 of the system 2, which may in turn generate a selected interpretation 304. Accordingly, the system 2 may be conditionally invoked such that generation of the interpretations may be skipped when an intent confidence is high. Accordingly, human confirmation may function as the control mechanism 300, prompt recall may be provided for similar future inputs, and the separation between human-facing language and machine-facing prompts may be streamlined.

Figure 7:
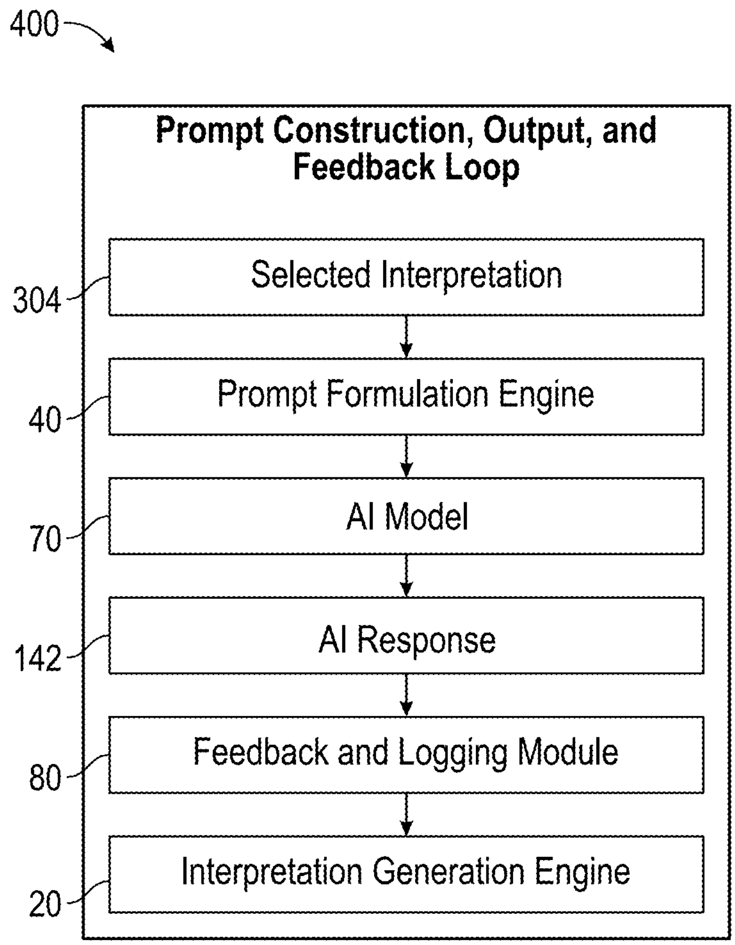
FIG. 7 shows a simplified view of an optional feedback loop for the system of FIG. 1.

FIG. 7 shows an optional feedback loop 400 in which user selections, post-response clarification requests, and/or helpfulness signals are logged and used to refine interpretations, mappings, and wording over time. As shown in FIG. 7, the selected interpretation 304 may be sent to the prompt formulation engine 40, which may be sent to the AI model 70, which may generate the response 142, which may be sent to the feedback and logging module 80, which in turn may be sent to the interpretation generation engine 20 for refined generation of future semantic interpretations.

Accordingly, the disclosed system 2 is not simply an AI assistant that rewrites prompts, but instead is a structured interaction loop wherein users express intent in plain language, the system 2 reflects back multiple semantic interpretations 122,124,126,128,154,156,158, the user consciously selects one, and the system 2 then generates a specific, optimized AI prompt 132 based on that selection. In other words, the system 2 does not just rewrite silently. Instead, the system 2 uses the user's selection among structured options as a signal of intent, and then translates that into an internal machine-friendly prompt. The system 2 is thus designed to be a universal front-end layer that can be embedded into many AI models (e.g., without limitation, consumer, enterprise, etc.) as a common accessibility and accuracy tool.

It will be understood that the abovementioned arrangements of apparatus are merely illustrative of applications of the principles of this invention and many other embodiments and modifications may be made without departing from the spirit and scope of the invention as defined in the claims.

What is claimed is:

1. A computer-implemented method comprising:

receiving a first textual statement from a user, the first textual statement comprising a first human intent;

translating the first human intent into at least one of a number of optimized AI instructions and a number of trigger structures;

employing an interpretation generation engine with the at least one of the number of optimized AI instructions and the number of trigger structures in order to generate a first plurality of semantic interpretations of the first textual statement and a first corresponding number of machine-optimized prompt representations generated for each of the first plurality of semantic interpretations, and without exposing the first corresponding number of machine-optimized prompt representations to the user;

receiving a selection of a first semantic interpretation of the first plurality of semantic interpretations from the user, the first semantic interpretation comprising a clarified human intent;

generating an artificial intelligence (AI) prompt based at least in part on the selection such that the AI prompt is configured to elicit an accurate response from an AI model that is substantially devoid of hallucinations, the response being based on the clarified human intent;

sending the AI prompt to the AI model in order to generate the response;

saving the AI prompt in a storage in order to reduce repeated clarification cost associated with the interpretation generation engine and let the AI prompt compound over time;

saving the first semantic interpretation in the storage after the selection from the user;

receiving a second textual statement from the user, the second textual statement comprising a second human intent; and remembering and utilizing the selection of the first semantic interpretation with the interpretation generation engine to generate a second plurality of semantic interpretations of the second textual statement, the second plurality of semantic interpretations comprising the first semantic interpretation because the second textual statement has a request signature matching a request signature of the first textual statement, thereby allowing the first semantic interpretation to compound over time and wherein the method further comprises logging data corresponding to the selection, whether clarification on the first plurality of semantic interpretations was requested by the user, and whether the user rated the response as helpful, and refining the interpretation generation engine over time based on the data.

2. The method according to claim 1, further comprising, before receiving the first textual statement from the user, receiving a selective activation of the interpretation generation engine from the user.

3. The method according to claim 1, before employing the interpretation generation engine:

determining whether the first textual statement has a semantic clarity level above a predetermined threshold, and either:

sending the first textual statement directly to the AI model without first employing the interpretation generation engine if the semantic clarity level is above the predetermined threshold, or employing the interpretation generation engine to generate the first plurality of semantic interpretations if the semantic clarity level is below the predetermined threshold.

4. The method according to claim 1, wherein saving the first semantic interpretation is performed independent of a conversation between the user and the AI model comprising data beyond the first and second textual statements.

5. The method according to claim 1, further comprising displaying the second plurality of semantic interpretations to the user in a manner wherein the first semantic interpretation is displayed as a first option of the second plurality of semantic interpretations.

6. The method according to claim 1, wherein the first plurality of semantic interpretations comprises the first semantic interpretation and a second semantic interpretation, wherein the clarified human intent comprises a first clarified human intent, and wherein the second semantic interpretation comprises a second clarified human intent different than the first clarified human intent.

7. The method according to claim 1, wherein the interpretation generation engine comprises at least one of a number of rules, a number of templates, a number of probabilistic models, and at least one machine-learning model.

8. The method according to claim 1, wherein generating the AI prompt is further based on the first textual statement.

9. The method according to claim 1, wherein the first textual statement is selected from the group consisting of a typed textual statement and a spoken textual statement.

10. The method according to claim 1, wherein each of the first plurality of semantic interpretations are framed as a structured query style directive.

11. A system comprising:

a user input device configured to receive a first textual statement from a user, the first textual statement comprising a first human intent;

an interpretation generation engine configured to receive the first textual statement and employ at least one of a number of optimized AI instructions of the first human intent and a number of trigger structures of the first human intent with the first textual statement in order to generate a first plurality of semantic interpretations of the first textual statement and a first corresponding number of machine-optimized prompt representations for each of the first plurality of semantic interpretations, the first plurality of semantic interpretations and the first corresponding number of machine-optimized prompt representations being generated without exposing the first corresponding number of machine-optimized prompt representations to the user;

a user selection module configured to receive a selection of a first semantic interpretation of the first plurality of semantic interpretations from the user, the first semantic interpretation comprising a clarified human intent and being configured to be saved in a storage after selection from the user;

a prompt formulation engine configured to generate an artificial intelligence (AI) prompt based at least in part on the selection such that the AI prompt is configured to elicit an accurate response from an AI model that is substantially devoid of hallucinations, the response being based on the clarified human intent, the AI prompt being configured to be saved in the storage in order to reduce repeated clarification cost associated with the interpretation generation engine and let the AI prompt compound over time;

an AI engine interface configured to send the AI prompt to the AI model; and a response handling module configured to generate the response, wherein the user input device is further configured to receive a second textual statement from the user, the second textual statement comprising a second human intent, and wherein the interpretation generation engine is configured to remember and utilize the selection of the first semantic interpretation to generate a second plurality of semantic interpretations of the second textual statement, the second plurality of semantic interpretations comprising the first semantic interpretation because the second textual statement has a request signature matching a request signature of the first textual statement, thereby allowing the first semantic interpretation to compound over time and wherein the system further comprises a feedback and logging module configured to log data corresponding to the selection, whether clarification on the first plurality of semantic interpretations was requested by the user, and whether the user rated the response as helpful, and refine the interpretation generation engine overtime based on the data.

12. The system according to claim 11, wherein the user input device is further configured to allow for selective activation of the interpretation generation engine from the user before receiving the first textual statement from the user.

13. The system according to claim 11, wherein the interpretation generation engine is configured to determine whether the first textual statement has a semantic clarity level above a predetermined threshold, and either send the first textual statement directly to the AI model if the semantic clarity level is above the predetermined threshold, or generate the first plurality of semantic interpretations if the semantic clarity level is below the predetermined threshold.

14. The system according to claim 11, wherein the first plurality of semantic interpretations comprises the first semantic interpretation and a second semantic interpretation, wherein the clarified human intent comprises a first clarified human intent, and wherein the second semantic interpretation comprises a second clarified human intent different than the first clarified human intent.

* * * * *